United States Patent
Kim et al.

(10) Patent No.: US 12,147,945 B2
(45) Date of Patent: *Nov. 19, 2024

(54) SYSTEMS AND METHODS FOR PROVIDING STOWING LOCATION RECOMMENDATION

(71) Applicant: COUPANG CORP., Seoul (KR)

(72) Inventors: Ji Eun Kim, Seoul (KR); Da Young Kim, Gyeonggi-do (KR); Hyun Yop Jung, Seoul (KR); SungWoo Kang, Seoul (KR); Sun Young Hong, Seoul (KR)

(73) Assignee: COUPANG CORP., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,928

(22) Filed: Jan. 12, 2022

(65) Prior Publication Data
US 2022/0138685 A1 May 5, 2022

Related U.S. Application Data

(63) Continuation of application No. 16/522,919, filed on Jul. 26, 2019, now Pat. No. 11,392,893.

(51) Int. Cl.
*G06Q 10/0875* (2023.01)
*G06K 7/14* (2006.01)
(Continued)

(52) U.S. Cl.
CPC ....... *G06Q 10/0875* (2013.01); *G06K 7/1413* (2013.01); *G06N 5/046* (2013.01); *G06Q 10/087* (2013.01); *G06Q 30/0631* (2013.01)

(58) Field of Classification Search
CPC ................ G06Q 30/0631; G06Q 10/0875
See application file for complete search history.

(56) References Cited

U.S. PATENT DOCUMENTS 8,024,064 B1 * 9/2011 Sanghavi ............. G06Q 10/087
  705/28
8,055,377 B2 11/2011 Yair et al.
(Continued)

FOREIGN PATENT DOCUMENTS

| CN | 105032783 A | 7/2015 |
| JP | 2005-112530 | 4/2005 |

(Continued)

OTHER PUBLICATIONS

"Evolution of Warehouse Management Systems", 2010 (Year: 2010).*
(Continued)

*Primary Examiner* — Allen C Chein
(74) *Attorney, Agent, or Firm* — FINNEGAN, HENDERSON, FARABOW, GARRETT & DUNNER, LLP

(57) ABSTRACT

The present disclosure provides systems and methods for providing stowing location recommendation, comprising a memory storing instructions and a processor configured to execute the instructions to receive, from a user device associated with a user, a request for a location recommendation for stowing an inbound product, determine a plurality of locations to recommend within a zone, sample, based on a predetermined rule, a number of locations for stowing the inbound product, and display, via the user device, the sampled number of locations to the user for stowing the inbound product. The processor is also configured to receive, from the user device, a selection of a stowing location among the sampled number of locations and modify a database to assign a location identifier associated with the selected stowing location to the inbound product.

20 Claims, 11 Drawing Sheets

(51) Int. Cl.
  *G06N 5/046* (2023.01)
  *G06Q 10/087* (2023.01)
  *G06Q 30/0601* (2023.01)

(56) References Cited

U.S. PATENT DOCUMENTS

| | | | |
|---|---|---|---|
| 8,494,673 | B2 | 7/2013 | Miranda et al. |
| 9,382,068 | B1* | 7/2016 | Quan ................... B65G 1/1371 |
| 9,715,674 | B1 | 7/2017 | Quan et al. |
| 10,322,881 | B1 | 6/2019 | Manyam et al. |
| 2014/0324491 | A1* | 10/2014 | Banks ................... G06Q 10/087 705/7.12 |
| 2016/0140397 | A1* | 5/2016 | Zhang ................... G06V 40/103 382/103 |
| 2016/0225115 | A1 | 8/2016 | Levy et al. |
| 2016/0253885 | A1 | 9/2016 | Nassar et al. |
| 2016/0260158 | A1* | 9/2016 | High ................... G05D 1/0214 |
| 2017/0039513 | A1* | 2/2017 | Jones ................... G06Q 10/087 |
| 2017/0146287 | A1* | 5/2017 | Rezayat ................... F25D 13/00 |
| 2017/0193434 | A1 | 7/2017 | Shah et al. |
| 2018/0060619 | A1 | 3/2018 | Bathurst |
| 2018/0253680 | A1 | 9/2018 | Jahani |
| 2018/0268348 | A1 | 9/2018 | Guan |
| 2018/0293543 | A1 | 10/2018 | Tiwari et al. |

FOREIGN PATENT DOCUMENTS

| | | |
|---|---|---|
| JP | 2016-511205 | 4/2016 |
| JP | 2019-512115 | 5/2019 |
| KR | 10-2015-0089794 | 8/2015 |
| KR | 10-1953069 B1 | 2/2019 |
| TW | 510998 | 5/2001 |
| TW | 201514910 A | 4/2015 |

OTHER PUBLICATIONS

"Oracle Warehouse Management", May 2002 (Year: 2002).*
Notice of Rejection Decision in counterpart Taiwanese Patent Application No. 109123644 dated Feb. 14, 2022 (11 pages).
Notice of Reasons for Rejection in counterpart Japanese Patent Application No. 2020-565436 dated May 17, 2022 (9 pages).
Examination Notice in counterpart Hong Kong Patent Application No. 22020010696.5 dated Jul. 16, 2021 (6 pages).
Examination Report in counterpart Australian Patent Application No. 2020264319 dated Jan. 12, 2021 (8 pages).
Notice of Preliminary Rejection in counterpart Korean Patent Application No. 10-2019-0109390 dated Apr. 26, 2021 (14 pages).
Office Action and Search Report in counterpart Taiwan Patent Application No. 109123644 Office Action dated Feb. 2, 2021 (31 pages).
PCT International Search Report for Application No. PCT/IB2020/056173, Oct. 6, 2020, (3 pages).
PCT Written Opinion of the International Searching Authority for Application No. PCT/IB2020/056173, Oct. 6, 2020, (5 pages).
Office Action and Search Report issued Aug. 20, 2021, in counterpart Taiwanese Application No. 109123644 (17 pages).
Notice of Reasons for Rejection issued Sep. 28, 2021, in counterpart Japanese Application No. 2020-565436 (10 pages).
Notice of Allowance issued Nov. 11, 2021, in counterpart Korean Application No. 10-2019-0109390 (4 pages).
Indispensable for Inventory Management: "Location Management", [online], [C000La] for Logistics Optimization, Oct. 1, 2018, the Internet <URL: https://cooola.ip/column/management/20181001.html>, (5 pages).
Implementing Zero Complaints for Reverse Shipments and Daily Reports for an Inventory According to Expiration Date, [online], Inventory Suite Cloud for Inventory/Warehouse Management, Aug. 8, 2013, the Internet <URL: https://infusion.co.ip/zsc/jireinavi/daifukub/> (9 pages).
Kim Joyce, "What Fruits Shouldn't be Stored Next to Each Other?", 2011, available at https://web.archive.org/web/20120702113827/https://www.livestrong.com/article/523091-what-fruits-shouldnt-be-stored-next-to-each-other/ (Year: 2011).
"Would the same product have the same barcode at a different location?", May 2017, available at https://www.quora.com/Would-the-same-product-have-the-same-barcode-at-a-different-location, (Year: 2017).
Vietnamese Office Action in counterpart application 1-2021-02618 dated Mar. 29, 2024 (4 pages).
Intellectual Property Office of Singapore Written Opinion in counterpart Application No. 11202011707S dated Jul. 26, 2019 (06 pages).

* cited by examiner

SYSTEMS AND METHODS FOR PROVIDING STOWING LOCATION RECOMMENDATION

RELATED APPLICATIONS

This application is a continuation of application Ser. No. 16/522,919 (now allowed) filed Jul. 26, 2019, which is hereby incorporated by reference in its entirety.

TECHNICAL FIELD

The present disclosure generally relates to computerized systems and methods for providing stowing location recommendations. In particular, embodiments of the present disclosure relate to inventive and unconventional systems related to providing a recommendation of one or more locations within a fulfillment center, at which inbound products may be stowed, based on a predetermined rule.

BACKGROUND

Various systems and methods exist for picking inbound products that arrive at warehouses and fulfillment center and stowing the inbound products. For example, as inbound products arrive at fulfillment centers, the inbound products may be stowed in fixed locations within a fulfillment center. Conventional systems and methods may be configured to designate different types of products to a predetermined location within the fulfillment center for stowing. Furthermore, based on certain restriction rules, conventional systems and methods may determine a location within the fulfillment center for stowing products. By way of example, based on the restrictions rules, all products with the same SKU may need to be placed in a fixed location within the fulfillment center, and all products with the same expiration date may need to be placed in another fixed location within the fulfillment center. While providing a fixed location for stowing each product may be helpful in organizing the inbound products within the fulfillment center, stowing inbound products in fixed locations for subsequent picking may be inefficient if not performed properly.

By way of example, a location for stowing a particular product may be full and may not be able to receive another inbound product for stowing. Because the location for stowing the particular product is full, a stowing worker may need to look for another empty location within the fulfillment center in order to stow the particular product. However, especially for large companies, fulfillment centers and warehouses may be extremely large, and thus, it may take a significant amount of time for the stowing worker to identify another empty location to stow the particular product. As a result, this may significantly delay the shipment and delivery of products to customers. In addition, by providing a fixed location for stowing a particular inbound product, the time it takes for a stowing worker to find the fixed location within the fulfillment center and stow the product may increase, thereby delaying the shipment and delivery of products to customers.

Therefore, there is a need for improved systems and methods for providing stowing location recommendation. In particular, there is a need for improved systems and methods for providing stowing location recommendation that is capable of determining a plurality of locations to recommend within a fulfillment center based on a predetermined rule. The predetermined rule may comprise one or more restrictions for stowing inbound products, which are taken into consideration when providing recommendations of a plurality of locations for stowing inbound products. The user may choose a location, among the recommended locations, that is closest to the user, for example, to stow an inbound product. As such, the time it takes for the user to stow the inbound product may decrease, thereby reducing any delay in shipment and delivery of products to customers.

SUMMARY

One aspect of the present disclosure is directed to a computer-implemented system for providing stowing location recommendation. The system may comprise a memory storing instructions and at least one processor configured to execute the instructions. The at least one processor may be configured to execute the instructions to receive, from a user device associated with a user, a request for a location recommendation for stowing at least one inbound product, determine a plurality of locations to recommend within a zone, sample, based on a predetermined rule, a number of locations from the plurality of locations for stowing the at least one inbound product, and display, via the user device, the sampled number of locations to the user for stowing the at least one inbound product. The request may comprise a zone associated with the at least one inbound product. The plurality of locations may be configured to store the at least one inbound product. The plurality of locations may be empty and may have not been recommended to another user different from the user. The predetermined rule may comprise at least one of a first restriction on a number of stock keeping units (SKUs) that can be stored in each location, a second restriction on an expiration date associated with each SKU, a third restriction on a barcode associated with each SKU, or a fourth restriction on a risk level associated with each SKU. The at least one processor may also be configured to receive, from the user device, a selection of a stowing location among the sampled number of locations, and modify a database to assign a location identifier associated with the selected stowing location to the inbound product.

In some embodiments, the plurality of locations may be at least 30%, 50%, or 70% empty. In some embodiments, the zone may comprise at least one of a picking zone or a buffer zone. The picking zone may be configured to store inbound products that are available for purchase by a customer. The buffer zone may be configured to store inbound products that are not available for purchase by a customer.

In some embodiments, the at least one processor may be configured to execute the instructions to provide, based on the first restriction, a recommendation to store a maximum of three different SKUs in each location. In other embodiments, the at least one processor may be configured to execute the instructions to prevent, based on the second restriction, a first inbound product associated with a first SKU having a first expiration date from being stored with a second inbound product associated with the first SKU having a second expiration date. In some embodiments, the at least one processor may be configured to execute the instructions to prevent, based on the third restriction, a first inbound product associated with a first SKU having a first barcode from being stored with a second inbound product associated with the first SKU having a second barcode. In some embodiments, the at least one processor may be configured to execute the instructions to provide, based on the fourth restriction, a recommendation to store SKUs having risk levels higher than a predetermined threshold separately. In yet another embodiment, the at least one processor may be configured to execute the instructions to provide, based on the fourth restriction, a recommendation to store SKUs having risk levels lower than a predetermined threshold in a particular location.

Another aspect of the present disclosure is directed to a computer-implemented method for providing stowing location recommendation. The method may comprise receiving, from a user device associated with a user, a request for a location recommendation for stowing at least one inbound product, determining a plurality of locations to recommend within a zone, sampling, based on a predetermined rule, a number of locations, among the plurality of locations, for stowing the at least one inbound product, and displaying, via the user device, the sampled number of locations to the user for stowing the at least one inbound product. The request may comprise a zone associated with the at least one inbound product. The plurality of locations may be configured to store the at least one inbound product. The plurality of locations may be empty and may have not been recommended to another user different from the user. The predetermined rule may comprise at least one of a first restriction on a number of stock keeping units (SKUs) that can be stored in each location, a second restriction on an expiration date associated with each SKU, a third restriction on a barcode associated with each SKU, or a fourth restriction on a risk level associated with each SKU. The method may also comprise receiving, from the user device, a selection of a stowing location among the sampled number of locations, and modifying a database to assign a location identifier associated with the selected stowing location to the inbound product.

In some embodiments, the plurality of locations may be at least 30%, 50%, or 70% empty. In some embodiments, the zone may comprise at least one of a picking zone or a buffer zone. The picking zone may be configured to store inbound products that are available for purchase by a customer. The buffer zone may be configured to store inbound products that are not available for purchase by a customer.

In some embodiments, the method may further comprise providing a recommendation to store a maximum of three different SKUs in each location, based on the first restriction. In some embodiments, the method may further comprise preventing a first inbound product associated with a first SKU having a first expiration date from being stored with a second inbound product associated with the first SKU having a second expiration date, based on the second restriction. In other embodiments, the method may further comprise preventing a first inbound product associated with a first SKU having a first barcode from being stored with a second inbound product associated with the first SKU having a second barcode, based on the third restriction. In yet another embodiment, the method may further comprise providing a recommendation to store SKUs having risk levels higher than a predetermined threshold separately, and to store SKUs having risk levels lower than a predetermined threshold in a particular location, based on the fourth restriction.

Yet another aspect of the present disclosure is directed to a computer-implemented system for providing stowing location recommendation. The system may comprise a memory storing instructions and at least one processor configured to execute the instructions. The at least one processor may be configured to execute the instructions to receive, from a user device associated with a user, a request for a location recommendation for stowing at least one inbound product, determine a plurality of locations to recommend within a zone, sample, based on a predetermined rule, a number of locations from the plurality of locations for stowing the at least one inbound product, and display, via the user device, the sampled number of locations to the user for stowing the at least one inbound product. The request may comprise a zone associated with the at least one inbound product. The zone may comprise at least one of a picking zone configured to store inbound products that are available for purchase by a customer, or a buffer zone configured to store inbound products that are not available for purchase by a customer. The plurality of locations may be configured to store the at least one inbound product. The plurality of locations may be at least 30%, 50%, or 70% empty and may have not been recommended to another user different from the user. The predetermined rule may comprise at least one of a first restriction on a number of stock keeping units (SKUs) that can be stored in each location, a second restriction on an expiration date associated with each SKU, a third restriction on a barcode associated with each SKU, or a fourth restriction on a risk level associated with each SKU. The at least one processor may also be configured to receive, from the user device, a selection of a stowing location among the sampled number of locations, and modify a database to assign a location identifier associated with the selected stowing location to the inbound product.

Other systems, methods, and computer-readable media are also discussed herein.

DETAILED DESCRIPTION

Figure 1A:
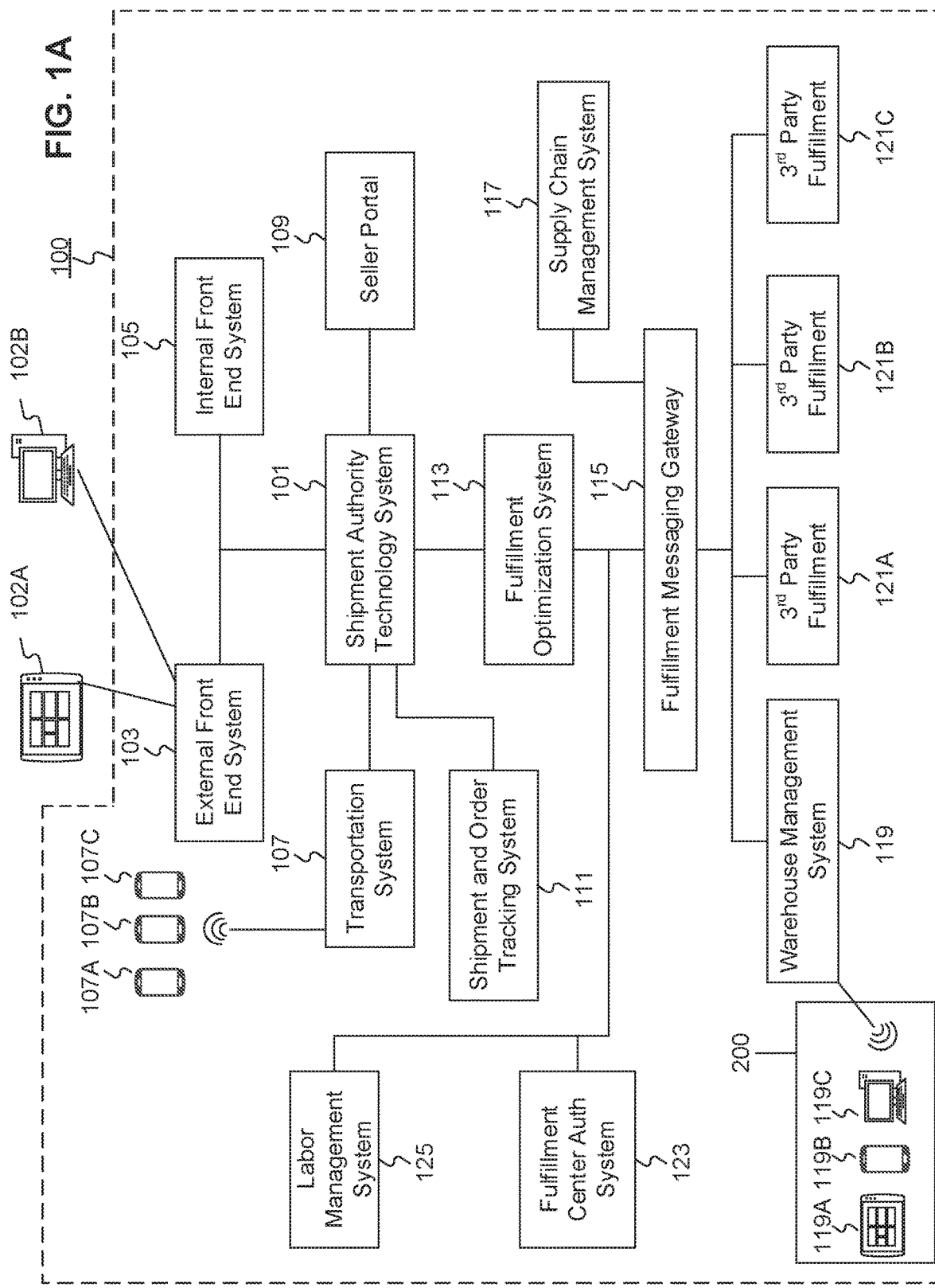
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
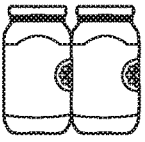
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for providing stowing location recommendation.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
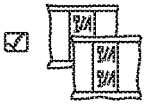
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
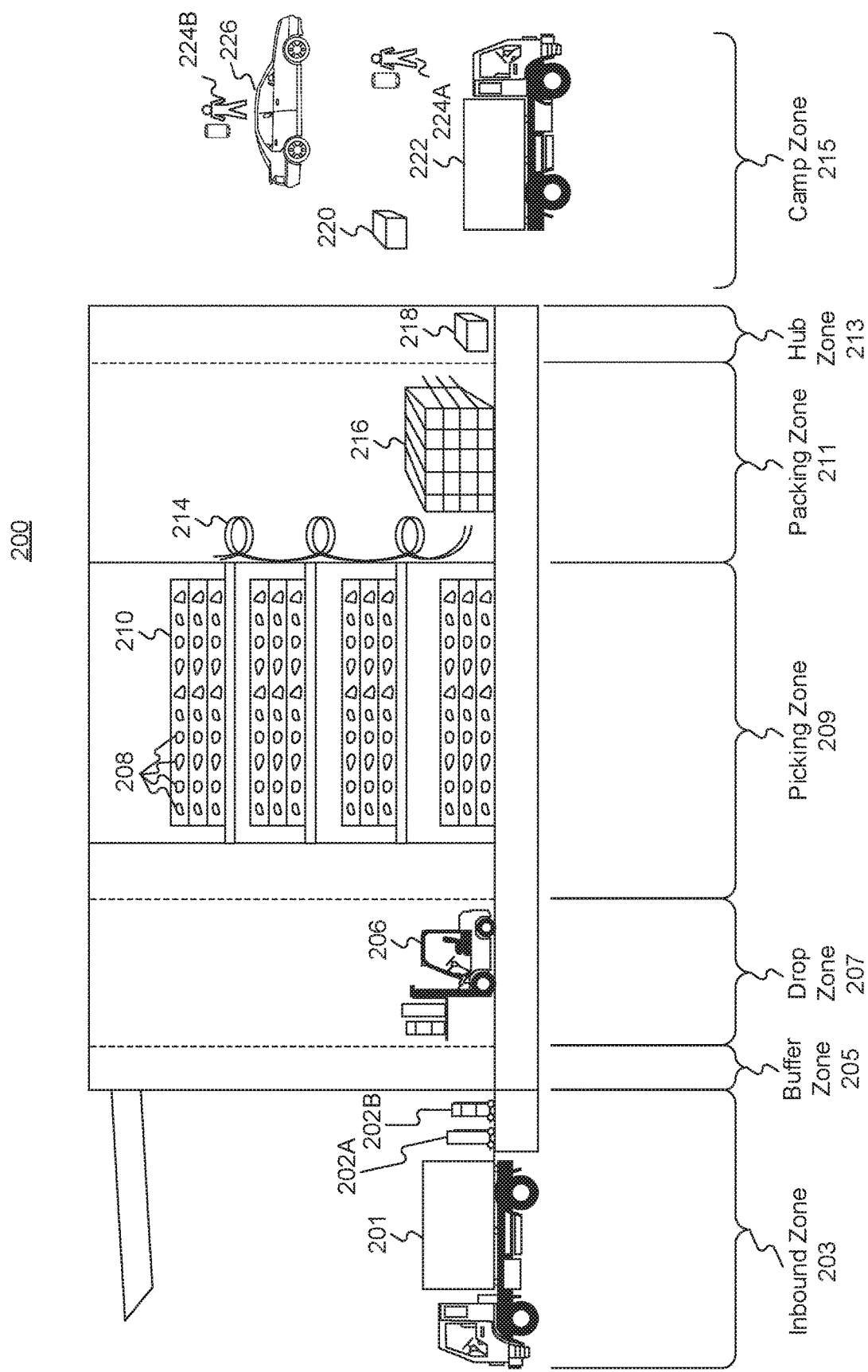
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
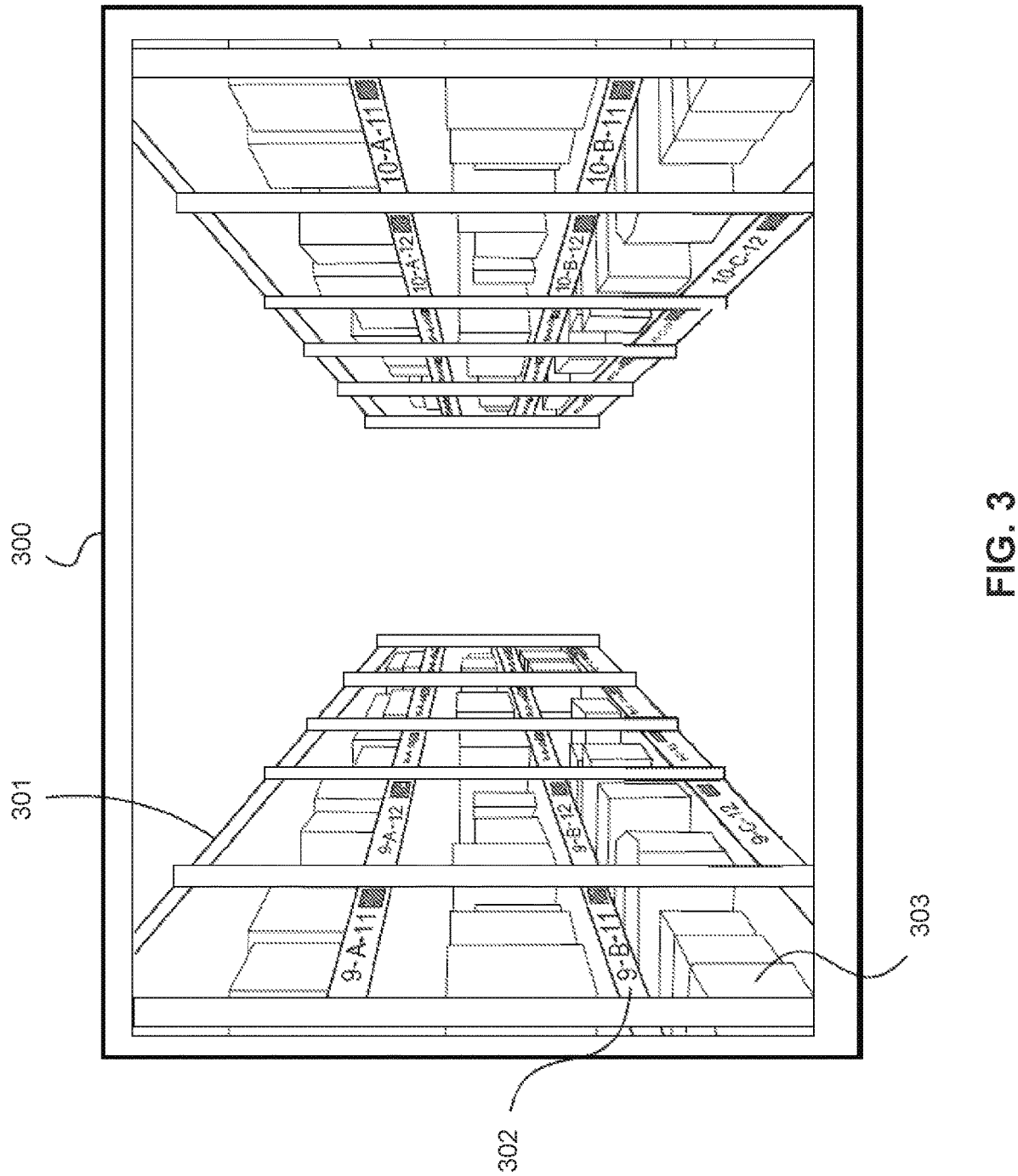
FIG. 3 is a diagrammatic illustration of an exemplary zone configured to receive inbound products, consistent with the disclosed embodiments.

FIG. 3 illustrates a zone 300 configured to receive inbound products in accordance with the disclosed embodiments. When inbound products are received in a warehouse, such as FC 200, a user, such as a stowing worker, may begin scanning product identifiers associated with the inbound products in order to stow the inbound products in one or more zones within FC 200. For example, the user may scan, using a user device, a product identifier associated with an inbound product for stowing, input a quantity of the inbound product for stowing using the user device, and select a zone 300 for stowing the inbound product. For example, the user may indicate, using the user device, whether the user will stow the inbound product in a picking zone, such as picking zone 209 of FIG. 2, or a buffer zone, such as buffer zone 205 of FIG. 2. The user device may send the scanned product identifier, the quantity of the inbound product, and the selected zone 300 to WMS 119. Based on the received information, WMS 119 may provide a plurality of location recommendations within the selected zone 300 for stowing the inbound product. The recommended locations within the selected zone 300 may comprise a plurality of storage units 301 within the selected zone 300. By way of example, WMS 119 may display a list of physical location identifiers 303 within the selected zone 300 on the user device. The list of physical location identifiers 303 may be associated with corresponding storage units 301, at which the inbound product may be stowed.

As discussed above, zone 300 may comprise a picking zone, such as picking zone 209 of FIG. 2, or a buffer zone, such as buffer zone 205 of FIG. 2. As shown in FIG. 3, zone 300 may be in a warehouse, such as FC 200. In zone 300, inbound products 303 may be stowed in storage units 301, which may include physical location identifiers 302. Storage units 301, in some embodiments, may be physical helving, bookshelves, boxes, totes, refrigerators, freezers, cold stores, or the like. Inbound products 303, in some embodiments, may be available for purchase by a customer and may be picked by a user (such as a stowing worker) or a machine, or when a customer places an order for inbound products 303 via a website hosted by external front end system 103. Physical location identifiers 302, in some embodiments, may be a unique address of a particular location of storage units 301.

In some embodiments, storage units 301, such as shelving, may have physical location identifiers 302 attached to it. Physical location identifiers 302 may be a unique address of a particular location of storage units 301. In some embodiments, physical location identifier 302 may indicate a particular product that is shelved at the location. But in other embodiments, physical location identifier 302 may indicate multiple products that are shelved together or closely together. Physical location identifier 302 may be an item barcode, RFID tag, or a matrix barcode, such as a Quick Response (QR) code. A camera or a scanner in a user device, such as a mobile device 119B, may scan physical location identifier 302 using an input device, such as an imaging device including a camera or a scanner. The scanned information may be sent to WMS 119. Based on the scanned information, WMS 119 may determine whether a user is at a location that is designated by WMS 119.

A batch may include one or more inbound products. A user, such as a stowing worker, may pick products included in an assigned batch in zone 300, until every product in the batch is picked. A user may move in zone 300, such as a warehouse, on foot. In some embodiments, users may use other devices that assist movement such as scooter, robot and/or vehicles.

In some embodiments, a user device may assist a user to find a designated location. In some embodiments, a mobile device may show a user a map with navigation. For example, the mobile device may inform a user to turn left upon reaching a certain location. In some embodiments, a mobile device may provide a signal, including, but not limited to a map, sound, vibration or text message for assisting users to find a designated location.

Figure 4:
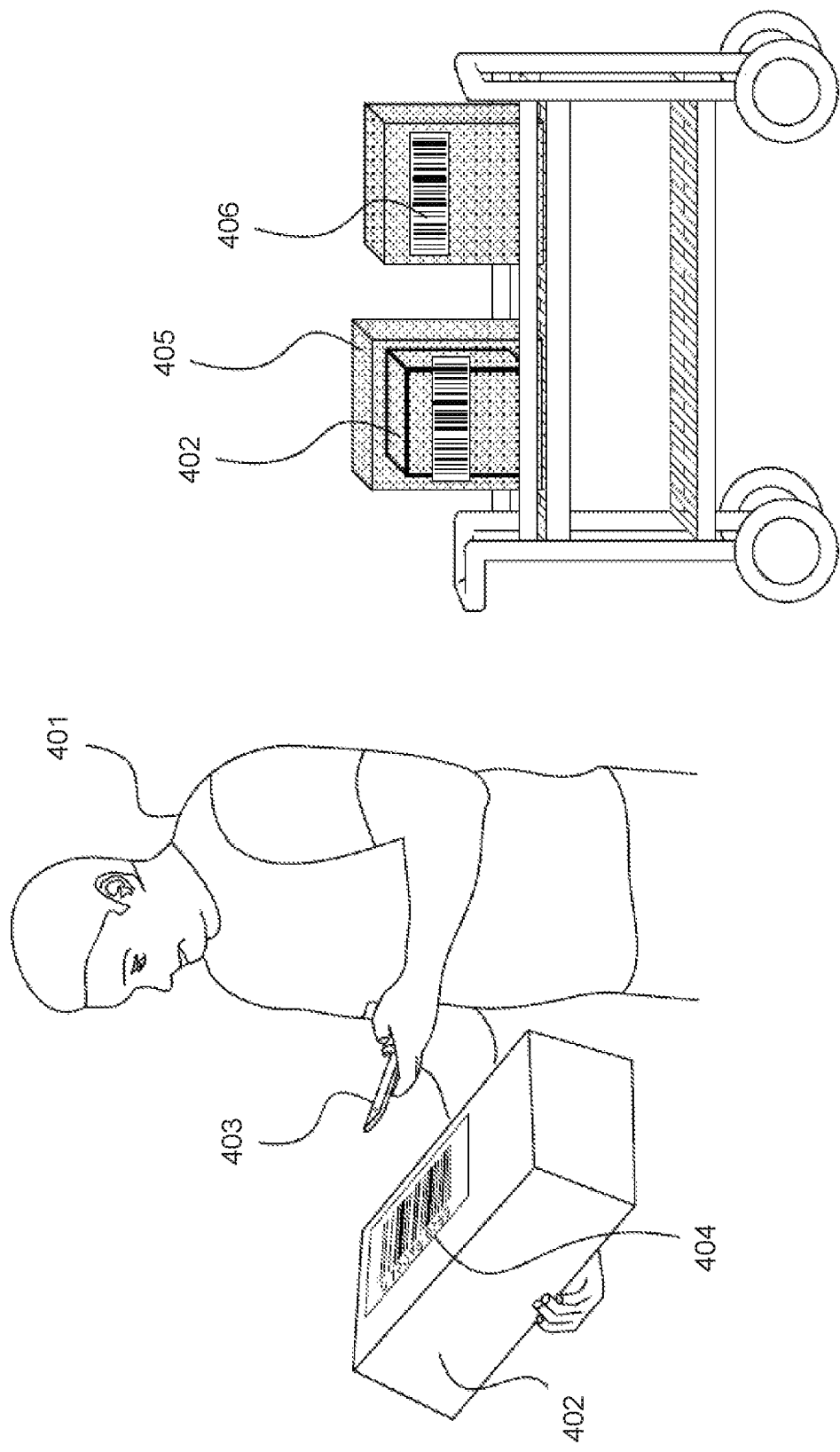
FIG. 4 is a diagrammatic illustration of an exemplary operation of a stowing worker in a zone, consistent with the disclosed embodiments.

FIG. 4 illustrates an operation of a user 401, such as a stowing worker, in zone 300 as shown in FIG. 3. In some embodiments, inbound products 402 may have product identifiers 404 attached to the products 402. Additionally or alternatively, product identifiers 404 may not be attached to the products 402, but instead, may be located near the products 402. Product identifiers 404 may comprise one or more of an item barcode, a stocking keeping unit (SKU), an RFID tag, a matrix barcode, such as Quick Response (QR) code, or the like.

A camera or a scanner in a user device, such as mobile device 403, may scan product identifier 404. Mobile device 403 may be similar to mobile device 119B of FIG. 1A. The scanned information may be transmitted to WMS 119 via wireless or wired network. Based on the received information, WMS 119 may provide a plurality of location recommendations within a zone, such as zone 300 of FIG. 3, for stowing the inbound product 402. By way of example, WMS 119 may display to a user a list of physical location identifiers, such as physical location identifiers 303, associated with corresponding locations within the zone. In some embodiments, the list of physical location identifiers 303 may be associated with corresponding storage units 301, at which the inbound product 402 may be stowed. User 401 may continue this operation until the last product 402 is stowed away.

In some embodiments, inbound products 402 may be placed in a container 405. In some embodiments, containers 405 may have container identifiers 406 attached to the containers 405. Additionally or alternatively, container identifiers 406 may not be attached to the containers 405, but instead, may be located near the containers 405. Container identifiers 405 may comprise one or more of an item barcode, an RFID tag, a matrix barcode, such as Quick Response (QR) code, or the like. Accordingly, instead of scanning product identifiers 404, user 401 may scan container identifier 406 associated with a container 405 holding an inbound product 402 for stowing. The scanned information may be transmitted to WMS 119 via wireless or wired network. Based on the received information, WMS 119 may provide a plurality of location recommendations within a zone, such as zone 300 of FIG. 3, for stowing the container 405 holding the inbound product 402. By way of example, WMS 119 may display to a user a list of physical location identifiers, such as physical location identifiers 303, associated with corresponding locations within the zone. In some embodiments, the list of physical location identifiers 303 may be associated with corresponding storage units 301, at which the container 405 holding the inbound product 402 may be stowed. User 401 may continue this operation until the last container 405 is stowed away.

Figure 5:
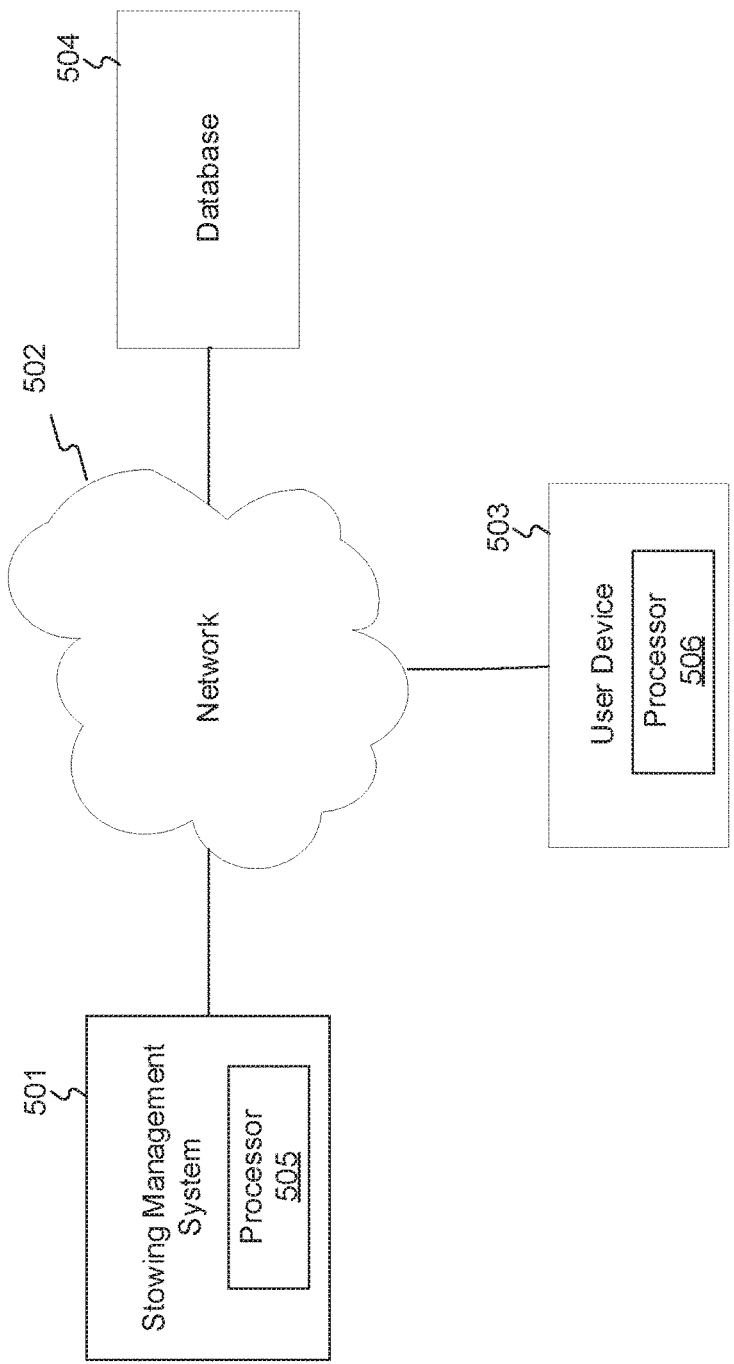
FIG. 5 is a schematic block diagram illustrating an exemplary embodiment of a system comprising a stowing management system for stowing products, consistent with the disclosed embodiments.

Referring to FIG. 5, a schematic block diagram illustrating an exemplary embodiment of a system 500 comprising a stowing management system 501 for providing stowing location recommendations. Stowing management system 501 may be associated with one or more systems in system 100 of FIG. 1A. For example, stowing management system 501 may be implemented as part of the WMS 119. Additionally or alternatively, stowing management system 501 may be implemented as part of the FOS 113. Stowing management system 501, in some embodiments, may be implemented as a computer system that receives requests for location recommendations for stowing inbound products and provides stowing location recommendations based on a predetermined rule. For example, stowing management system 501 may include one or more processors 505, which may receive a request, from a user device 503, for a location recommendation for stowing at least one inbound product, such as inbound product 402 of FIG. 4. One or more processors 505 may be configured to determine a plurality of locations to recommend within a zone selected by a user of the user device 503. By way of example, the user of user device 503 may specify, in the request, a zone, such as zone 300 of FIG. 3, for stowing the inbound product. One or more processors 505, in some embodiments, may determine a plurality of locations within the selected zone that are empty and have not been recommended to another user different from the user of user device 503. One or more processors 505 may also be configured to sample a number of locations from the plurality of locations based on a predetermined rule. The predetermined rule may comprise one or more restrictions associated with the plurality of locations within the selected zone and/or the inbound products. By way of example, one or more processors 505 may provide stowing location recommendations based on the predetermined rule.

System 500 may further comprise a database 504. Database 504 may be configured to store information associated with each zone in FC 200. For example, database 504 may store a list of every zone, such as picking zone or buffer zone in FC 200, physical location identifiers associated with each storage unit within each zone in FC 200, and/or real-time capacity of each storage unit. In addition, database 504 may store one or more restrictions associated with each storage unit in each zone. In some embodiments, the dimensions and/or parameters associated with each storage unit may vary. For example, there may be one or more storage units designated for stowing inbound products that need to be kept frozen or at a cool temperature. Additionally or alternatively, all food products may need to be stowed in one or more designated storage units within a particular zone. A person having ordinary skill in the art would envision other restrictions that may be placed on the storage units.

In some embodiments, a restriction may be placed on the number of different product identifiers that can be stored in each storage unit. For example, a storage unit may only be able to receive three different product identifiers for stowing. In some embodiments, a restriction may be placed on an expiration date associated with each product identifier that can be stored in each storage. For example, a storage unit may not be able to receive product identifiers associated with different expiration dates. As such, every product stowed in the storage unit may have the same expiration dates. In some embodiments, a restriction may be placed on a barcode associated with each product identifier that can be stored in each storage unit. For example, a storage unit may not be able to receive same product identifiers with different barcodes. In some embodiments, a restriction may be placed on a risk level associated with a product identifier that may be stored in each storage unit. For example, a product identifier with a high risk level may not be stored together with another product identifier with a high risk level in one storage unit. A risk level associated with a product identifier may be based on a monetary value of the corresponding inbound product. For example, an inbound product with a high monetary value may be more likely to be stolen (e.g., by someone working in FC 200) than another inbound product with a low monetary value. Accordingly, the inbound product with the high monetary value may be associated with a higher risk level than the other inbound product with the low monetary value. Database 504 may store each restriction associated with product identifiers and/or storage units in the zones.

In some embodiments, when one or more processors 505 recommends a location within a particular zone to a user for stowing an inbound product, one or more processors 505 may modify database 504 to assign a status to the physical location identifier associated with the recommended location. For example, one or more processors 505 may modify database 504 to assign a "Recommended" status to the physical location identifier associated with the recommended location. As such, when one or more processors 505 receives another request for a stowing location recommendation, one or more processors 505 may not recommend the location that was previously recommended to the first user.

Database 504 may include one or more memory devices that store information and are accessed through network 302. By way of example, database 504 may include Oracle™ databases, Sybase™ databases, or other relational databases or non-relational databases, such as Hadoop sequence files, HBase, or Cassandra. While database 504 is illustrated as being included in the system 500, it may alternatively be located remotely from system 500. In other embodiments, database 504 may be incorporated into stowing management system 501 and/or user device 503. Database 504 may include computing components (e.g., database management system, database server, etc.) configured to receive and process requests for data stored in memory devices of database 504 and to provide data from database 504.

System 500 may also comprise a network 502. Stowing management system 501, user device 503, and database 504 may be connected and be able to communicate with each other via network 502. Network 502 may be one or more of a wireless network, a wired network or any combination of wireless network and wired network. For example, network 502 may include one or more of a fiber optic network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving data.

In addition, network 502 may include, but not be limited to, telephone lines, fiber optics, IEEE Ethernet 802.3, a wide area network ("WAN"), a local area network ("LAN"), or a global network such as the Internet. Also network 502 may support an Internet network, a wireless communication network, a cellular network, or the like, or any combination thereof. Network 502 may further include one network, or any number of the exemplary types of networks mentioned above, operating as a stand-alone network or in cooperation with each other. Network 502 may utilize one or more protocols of one or more network elements to which they are communicatively coupled. Network 502 may translate to or from other protocols to one or more protocols of network devices. Although network 502 is depicted as a single network, it should be appreciated that according to one or more embodiments, network 502 may comprise a plurality of interconnected networks, such as, for example, the Internet, a service provider's network, a cable television network, corporate networks, and home networks.

System 500 may also comprise a server (not shown). The server may be a web server. The server, for example, may include hardware (e.g., one or more computers, including processors, storage, and input/output devices) and/or software (e.g., one or more applications) that deliver web content that can be accessed by, for example a user through a network (e.g., network 502), such as the Internet. The server may use, for example, a hypertext transfer protocol (HTTP or HTTPS) to communicate with a user. The web pages delivered to the user may include, for example, HTML documents, which may include images, style sheets, and scripts in addition to text content.

A user program such as, for example, a web browser, web crawler, or native mobile application, may initiate communication by making a request for a specific resource using HTTP and the server may respond with the content of that resource or an error message if unable to do so. The server also may enable or facilitate receiving content from the user so the user may be able to, for example, submit web forms, including uploading of files. The server may also support server-side scripting using, for example, Active Server Pages (ASP), PHP, or other scripting languages. Accordingly, the behavior of the server can be scripted in separate files, while the actual server software remains unchanged.

In other embodiments, the server may be an application server, which may include hardware and/or software that is dedicated to the efficient execution of procedures (e.g., programs, routines, scripts) for supporting its applied applications. The server may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model.

The server may act as a set of components accessible, for example, through an API defined by the platform itself. For Web applications, these components may be performed in, for example, the same running environment as web servers, and application servers may support the construction of dynamic pages. Application servers also may implement services, such as, for example, clustering, fail-over, and load-balancing. In various embodiments, where application servers are Java application servers, the web servers may behave like an extended virtual machine for running applications, transparently handling connections to databases associated with a backend on one side, and, connections to the Web client on the other.

User device 503 may be any computer device, or communications device including, but not limited to, a server, a network appliance, a personal computer (PC), a workstation, a mobile device, a phone, a handheld PC, a personal digital assistant (PDA), a thin client, a tablet computer, a smartphone, a fat client, an Internet browser, or other device. User device 503 may also be a tablet computer. Non-limiting examples of a tablet computer include an iPad, Kindle Fire, Playbook, Touchpad, and the like. User device 503 may be associated with a user having one or more accounts. For example, a user may download an application, such as a stowing app 600 in FIGS. 6A-6C, to user device 503. As discussed in more detail below, stowing app 600 may provide a graphical user interface (GUI) to access services provided by one or more processors 505 of stowing management system 501. The services, for example, may include an account profile. User device 503 may be configured to access the account profile associated with the user. When the user first launches stowing app 600 on user device 503, stowing app 600 may prompt the user to either create an account profile or log-in to an account profile. User device 503 may comprise one or more processors 506 that may be configured to create an account profile in response to input from the user and store the account of the user in database 504, via network 502. Additionally or alternatively, one or more processors 506 may be configured to log-in to an account profile of the user in response to input from the user, e.g., in response to receiving username and password from the user. Once one or more processors 506 successfully logs in to the account profile of the user, one or more processors 506 may grant access to the account profile to the user of user device 503. For example, one or more processors 506 may display stowing app 600 on the user device 503.

Figure 6C:
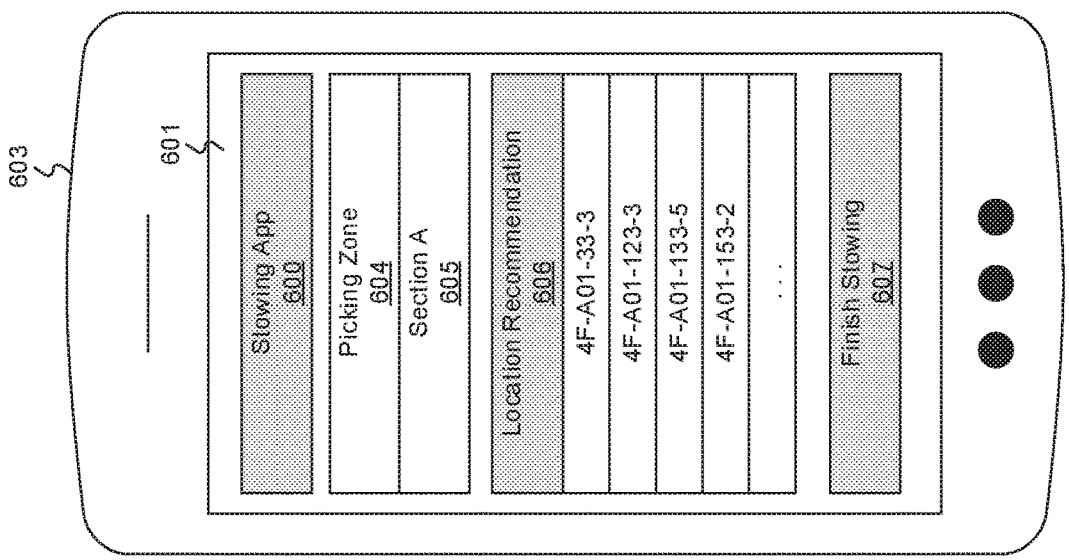
FIG. 6C is another diagrammatic illustration of the exemplary graphical user interface of FIG. 6A, consistent with the disclosed embodiments.
Figure 6B:
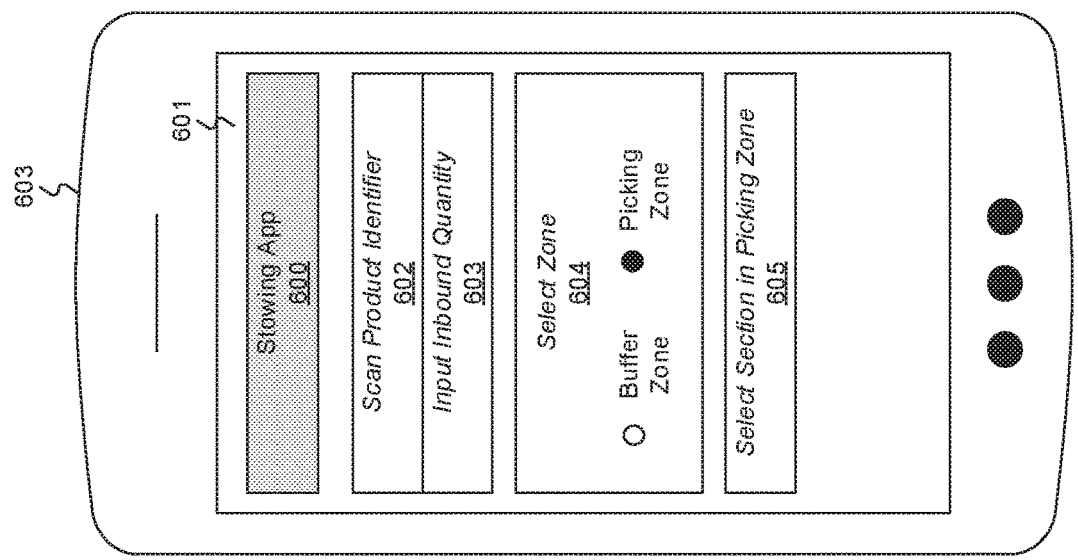
FIG. 6B is another diagrammatic illustration of the exemplary graphical user interface of FIG. 6A, consistent with the disclosed embodiments.
Figure 6A:
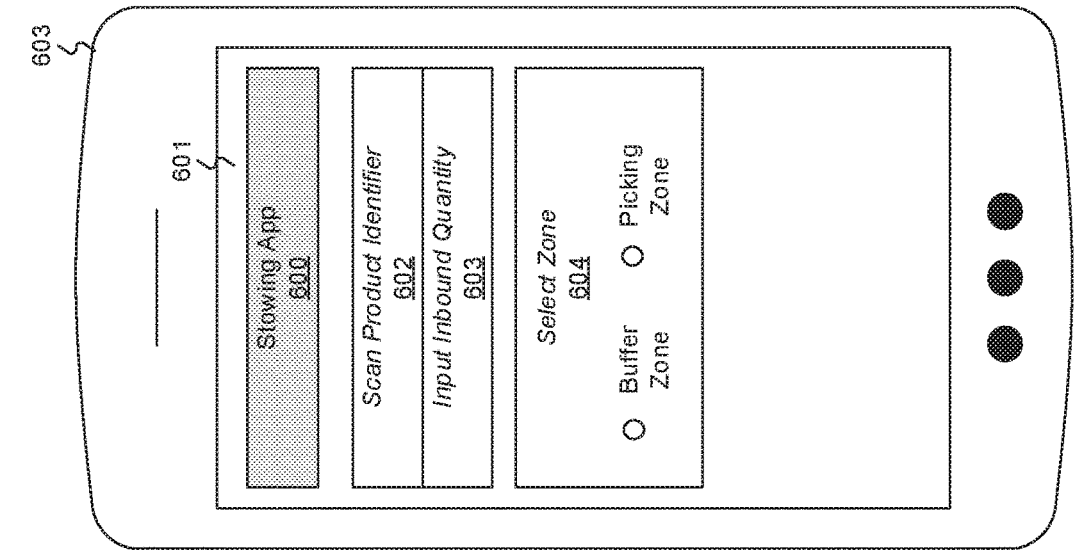
FIG. 6A is a diagrammatic illustration of an exemplary graphical user interface on a user device configured to provide stowing location recommendation, consistent with the disclosed embodiments.

FIGS. 6A-6C depict exemplary embodiments of graphical user interfaces (GUIs) 601 that may be presented to the user on user device 603 via stowing app 600. User device 603 may be similar to user device 503 of FIG. 5, user device 403 of FIG. 4, and/or device 1198 of FIG. 1A. In particular, FIG. 6A shows an example embodiment of an interface 610 on user device 603 configured to display one or more inputs from the user. For example, interface 610 of the stowing app 600 may be configured to receive a product identifier 602 associated with an inbound product for stowing, a quantity 603 of the inbound product for stowing, and a zone 604 at which a user, such as a stowing worker, will stow the inbound product. One or more processors, such as one or more processors 506, of user device 603 may be configured to receive the product identifier 602, the quantity 603, and the zone 604 and send the information to one or more processors 505 of stowing management system 501 via network 502. For example, the user may scan the product identifier 602 using user device 603, and one or more processors may automatically display the product identifier 602 on the interface 601. In addition, the user may input the quantity 603 of the inbound product for stowing by interacting directly with interface 601. For example, the user may input a number representing the quantity 603 of the inbound product for stowing in interface 601.

As seen in FIG. 6A, the user of user device 603 may select a zone 604, at which the user will stow the inbound product. By way of example, the user may touch "Buffer Zone" or "Picking Zone" in order to select the zone 604 on interface 601. The zone 604 may comprise a picking zone, such as picking zone 209 of FIG. 2, or a buffer zone, such as buffer zone 205 of FIG. 2. A picking zone, in some embodiments, may be configured to store inbound products that are available for purchase by a customer. A buffer zone, in some embodiments, may be configured to store inbound products that are not available for purchase by a customer. For example, inbound products stored in the buffer zone may need to be further processed in FC 200, and thus, may not be ready for purchase by a customer.

As seen in FIG. 6B, when the user selects zone 604 in interface 601 of user device 603, one or more processors 506 of user device 603 may display to the user instructions to select a section 605 in the selected zone 604, at which the user will stow the inbound product. Section 605 may refer to an area in the selected zone 604, an aisle in the selected zone 604, a storage unit in the selected zone 604, or any combination thereof. In some embodiments, the user may input the section 605 in the selected zone 604 by directly interacting with interface 601. For example, the user may input a letter, number, word, symbol, and/or image representing the section 605 in interface 601. In other embodiments, one or more processors 506 of user device 603 may instruct the user to scan a location identifier associated with the section 605 in the selected zone 604. Similar to the physical location identifier 302 associated with each storage unit 301 of FIG. 3, every section 605 in the selected zone 604 may be associated with a location identifier. The location identifier may be attached to or be near each corresponding section 605 in the selected zone 604. When the user scans the location identifier associated with the section 605, one or more processors 506 of user device 603 may automatically display the corresponding section 605 in interface 601.

When one or more processors 506 of user device 603 receives the product identifier 602 associated with the inbound product, a quantity 603 of the inbound product for stowing, a zone 604 for stowing the product, and a section 605 within the zone 604 for stowing the product, one or more processors 506 may send a request to one or more processors 505 of stowing management system 501 for a location recommendation for stowing the inbound product. One or more processors 505 of stowing management system 501 may retrieve, from database 304, information associated with the selected section 605 within the selected zone 604. As discussed above, information may comprise, for example, physical location identifiers associated with each storage unit within the selected section 605 of zone 604, real-time capacity of each storage unit, and/or one or more restrictions associated with each storage unit. In addition, one or more processors 505 may retrieve, from database 304, information associated with the status of each storage unit in order to determine which storage units within the selected section 605 have been recommended to another user different from the user of user device 603.

In some embodiments, from information stored in database 304, one or more processors 505 of stowing management system 501 may identify every storage unit that is capable of storing the inbound product. For example, one or more processors 505 may identify every storage unit that is at least partially empty and has not been recommended to another user within section 605. By way of example, the identified storage unit may be at least 30% empty, at least 50% empty, or at least 70% empty. In some embodiments, emptiness of each storage unit may be defined by the volume of empty space in each storage unit. In other embodiments, emptiness of each storage unit may be defined by the number of products already stowed in each storage unit. For example, each storage unit may have a maximum number of products that it can stow, and emptiness may be defined by the number of products stowed in each storage unit subtracted from the maximum number of products each storage unit can stow. In FC 200, there may be one or more sensors, such as image sensor(s) or camera(s), in each zone 604 or each section 605 that may be configured to acquire an image or a video of each storage unit. As such, the one or more sensors may monitor the emptiness of each storage unit. For example, from the images and/or videos acquired by the one or more sensors, one or more processors 505 may determine the emptiness of each storage unit and the capacity of each storage unit.

In some embodiments, one or more processors 505 may determine one or more parameters associated with the inbound product based on the product identifier 602. For example, one or more processors 505 may look up the product identifier in database 304 and determine one or more parameters associated with the inbound product associated with the product identifier. Database 304 may store one or more parameters associated with the product identifier. One or more parameters may include, but is not limited to, a temperature requirement, a risk level, an expiration date, a barcode, or any other parameter associated with the inbound product. When the inbound product is received in FC 200, one or more processors 505 may modify database 304 to assign such parameters to the product identifier associated with the inbound product. Based on one or more parameters associated with the product identifier, one or more processors 505 may identify every storage unit in selected section 605 of zone 604 that is configured to receive inbound products associated with the one or more parameters. For example, if a particular inbound product needs to be stored at a predetermined temperature, one or more processors 505 may identify every storage unit in selected section 605 of zone 604 that is capable of maintaining the inbound product at the predetermined temperature, that is at least partially empty, and that has not been recommended to a different user. By way of example, the identified storage unit may be at least 30% empty, at least 50% empty, or at least 70% empty.

Once every storage unit capable of receiving the inbound product has been identified, one or more processors 505 may sample a number of storage units (e.g., locations) from the identified storage units for stowing the inbound product. By way of example, one or more processors 505 may implement a predetermined rule when sampling the number of storage units from the identified storage units. The predetermined rule, as discussed above, may comprise one or more restrictions.

In some embodiments, a restriction may be placed on the number of different product identifiers that can be stored in each storage unit. For example, a storage unit may only be able to receive three different product identifiers for stowing. In some embodiments, a restriction may be placed on an expiration date associated with each product identifier that can be stored in each storage. For example, a storage unit may not be able to receive product identifiers associated with different expiration dates. As such, every product stowed in the storage unit may have the same expiration dates. In some embodiments, a restriction may be placed on a barcode associated with each product identifier that can be stored in each storage unit. For example, a storage unit may not be able to receive same product identifiers with different barcodes. In some embodiments, a restriction may be placed on a risk level associated with a product identifier that may be stored in each storage unit. For example, a product identifier with a high risk level may not be stored together with another product identifier with a high risk level in one storage unit. A risk level associated with a product identifier may be based on a monetary value of the corresponding inbound product. For example, an inbound product with a high monetary value may be more likely to be stolen than another inbound product with a low monetary value. Accordingly, the inbound product with the high monetary value may be associated with a higher risk level than the other inbound product with the low monetary value.

One or more processors 505 may sample a number of storage units from the identified storage units that satisfies the one or more restrictions in the predetermined rule. Then, one or more processors 505 may display to the user the sampled number of storage units for stowing the inbound product. By way of example, one or more processors 505 may display location recommendation 606 in interface 601. As seen in FIG. 6C, location recommendation 606 may comprise a list of physical location identifiers 302 associated with the sampled number of storage units 301 that are capable of receiving the inbound product for stowing. Location recommendation 606, in some embodiments, may comprise a list of at least three, at least five, or at least ten physical location identifiers 302 associated with the storage units 301 that are capable of receiving the inbound product. The user of user device 603 may select any of the storage units 301 in location recommendation 606 for stowing the inbound product. By way of example, the user may select a storage unit 301, among those in location recommendation 606, that is closest in proximity to the user to stow the inbound product. As such, the user may not only reduce stowing time by receiving location recommendations from stowing management system 501, but the user may also reduce stowing time by choosing a storage unit, among those that are recommended to the user, that is closest to the user's current location in FC 200.

Once the user has selected a storage unit, among those that are recommended to the user via location recommendation 606, to stow the inbound product, the user may press on the corresponding physical location identifier in interface 601 and press the "Finish Stowing" button 607. One or more processors 506 of user device 603 may send the selected storage unit information (e.g., physical location identifier associated with the selected storage unit) to one or more processors 505 of stowing management system 501. Then, one or more processors 505 of stowing management system 501 may modify database 304 to assign the physical location identifier to the product identifier 602 associated with the inbound product.

Figure 7:
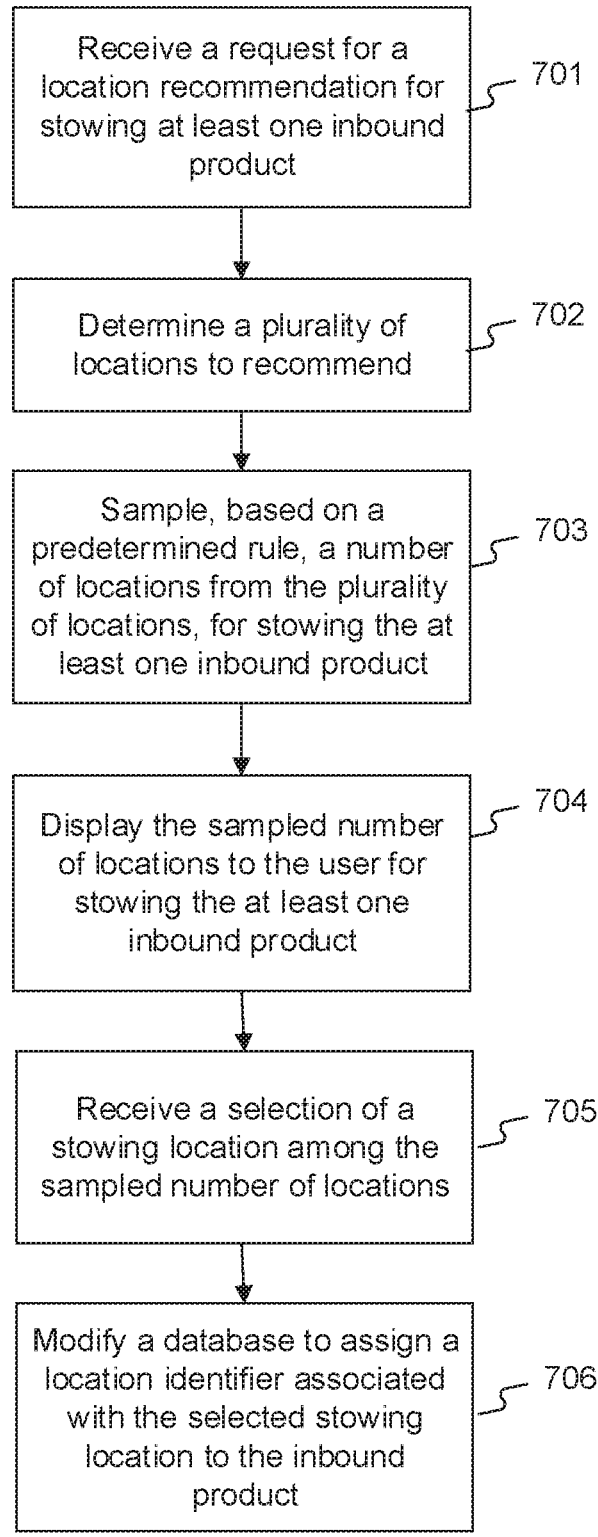
FIG. 7 is a flowchart illustrating an exemplary embodiment of a method for providing stowing location recommendation, consistent with the disclosed embodiments.

FIG. 7 is a flow chart illustrating an exemplary method 700 for providing stowing location recommendation. This exemplary method is provided by way of example. Method 700 shown in FIG. 7 can be executed or otherwise performed by one or more combinations of various systems. Method 700 as described below may be carried out by stowing management system 501 and/or user device 503, as shown in FIG. 5, by way of example. While various elements of stowing management system 501 are referenced in explaining the method of FIG. 7, it should be noted that various elements of user device 503 may carry out the method of FIG. 7. Each block shown in FIG. 7 represents one or more processes, methods, or subroutines in the exemplary method 700. Referring to FIG. 7, exemplary method 700 may begin at block 701.

At block 701, one or more processors 505 may receive, from a user device, such as user device 1198, user device 403, or user device 503, a request for a location recommendation for stowing at least one inbound product. As discussed with reference to FIGS. 6A-6C, the request may comprise at least one of a product identifier 602 associated with the inbound product, a quantity 603 of the inbound product for stowing, a zone 604, and a section 605 within zone 604 at which a user of the user device will stow the inbound product.

After receiving the request for location recommendation, method 700 may proceed to block 702. At block 702, one or more processors 505 may determine a plurality of locations to recommend within zone 604. In particular, one or more processors 505 may determine a plurality of locations to recommend within section 605 of zone 604 that are capable of storing the inbound product. In some embodiments, one or more processors 505 may retrieve, from database 304, information associated with section 605 of zone 604. As discussed above, information may comprise, for example, physical location identifiers associated with each storage unit within the selected section 605 of zone 604, real-time capacity of each storage unit, and/or one or more restrictions associated with each storage unit. In addition, one or more processors 505 may retrieve, from database 304, information associated with the status of each storage unit in order to determine which storage units within section 605 have been recommended to another user different from the user of user device 603.

In some embodiments, from information stored in database 304, one or more processors 505 of stowing management system 501 may identify every storage unit that is capable of storing the inbound product. For example, one or more processors 505 may identify every storage unit that is at least partially empty and has not been recommended to another user within section 605. By way of example, the identified storage unit may be at least 30% empty, at least 50% empty, or at least 70% empty.

In some embodiments, one or more processors 505 may determine one or more parameters associated with the inbound product based on a product identifier, such as product identifier 602 of FIG. 6. For example, one or more processors 505 may look up the product identifier associated with the inbound product in database 304 and determine one or more parameters associated with the inbound product. One or more parameters may include, but are not limited to, a temperature requirement, a risk level, an expiration date, a barcode, or any other parameter associated with the inbound product. Based on one or more parameters associated with the inbound product, one or more processors 505 may identify every storage unit in section 605 of zone 604 that is configured to receive inbound products associated with the one or more parameters. For example, if a particular inbound product needs to be stored at a predetermined temperature, one or more processors 505 may identify every storage unit in section 605 of zone 604 that is capable of maintaining the inbound product at the predetermined temperature, that is at least partially empty, and that has not been recommended to a different user. By way of example, the identified storage unit may be at least 30% empty, at least 50% empty, or at least 70% empty.

Once a plurality of locations (e.g., storage units) within zone 604 for stowing the inbound product has been determined, method 700 may proceed to block 703. At block 703, one or more processors 505 may sample a number of locations (e.g., storage units) from the plurality of locations for stowing the inbound product. By way of example, one or more processors 505 may implement a predetermined rule when sampling the number of locations from the plurality of locations. The predetermined rule, as discussed above, may comprise one or more restrictions.

In some embodiments, a restriction may be placed on the number of different product identifiers that can be stored in each location (e.g., storage unit). For example, a location or storage unit may only be able to receive three different product identifiers for stowing. In some embodiments, a restriction may be placed on an expiration date associated with each product identifier that can be stored in each location or storage. For example, a location or storage unit may not be able to receive product identifiers associated with different expiration dates. As such, every product stowed in the location or storage unit may have the same expiration dates. In some embodiments, a restriction may be placed on a barcode associated with each product identifier that can be stored in each location or storage unit. For example, a location or storage unit may not be able to receive same product identifiers with different barcodes. In some embodiments, a restriction may be placed on a risk level associated with a product identifier that may be stored in each location or storage unit. For example, a product identifier with a high risk level may not be stored together with another product identifier with a high risk level in one location or storage unit. A risk level associated with a product identifier may be based on a monetary value of the corresponding inbound product. For example, an inbound product with a high monetary value may be more likely to be stolen than another inbound product with a low monetary value. Accordingly, the inbound product with the high monetary value may be associated with a higher risk level than the other inbound product with the low monetary value.

In some embodiments, based on one restriction in the predetermined rule, one or more processors 505 may be configured to provide a recommendation to the user to store a maximum of three different product identifiers (e.g., SKUs) in each location or storage unit. In other embodiments, based on another restriction in the predetermined rule, one or more processors 505 may be configured to prevent the inbound product from being stored with another inbound product with the same product identifier but with a different expiration date. Accordingly, a location or storage unit may not be able to receive same inbound products that have different expiration dates. In some embodiments, based on another restriction in the predetermined rule, one or more processors 505 may be configured to prevent the inbound product from being stored with another inbound product with the same product identifier but with a different barcode. Each inbound product may be associated with a product identifier and a barcode separate from the product identifier. Accordingly, a location or storage unit may not be able to receive same inbound products that have different barcodes. In some embodiments, based on another restriction in the predetermined rule, one or more processors 505 may be configured to provide a recommendation to store inbound products associated with the product identifiers having risk levels higher than a predetermined threshold separately. For example, an inbound product associated with a product identifier with a high risk level may not be stored together with another inbound product associated with a product identifier with a high risk level. In yet another embodiment, based on another restriction in the predetermined rule, one or more processors 505 may be configured to provide a recommendation to store inbound products associated with product identifiers having risk levels lower than the predetermined threshold in a particular location. For example, one or more processors 505 may provide the user with a recommendation to stow all inbound products with low risk level product identifiers in particular locations within the zone, such as in the lower storage units within the zone.

One or more processors 505 may sample a number of locations from the plurality of locations that satisfies the one or more restrictions in the predetermined rule. Then, method 700 may proceed to block 704. At block 704, one or more processors 505 may display to the user, via the user device, the sampled number of locations (e.g., storage units) for stowing the inbound product. By way of example, as seen in FIG. 6C, one or more processors 505 may display location recommendation 606 in interface 601. Location recommendation 606 may comprise a list of physical location identifiers 302 associated with the sampled number of storage units 301 that are capable of receiving the inbound product for stowing. Location recommendation 606, in some embodiments, may comprise a list of at least three, at least five, or at least ten physical location identifiers 302 associated with the storage units 301 that are capable of receiving the inbound product.

Method 700 may proceed to block 705. At block 705, one or more processors 505 may receive, from the user device 603, a selection of a stowing location among the sampled number of locations. By way of example, once the sampled number locations are displayed on interface 601 of user device 603, the user of user device 603 may select any of the storage units 301 in location recommendation 606 for stowing the inbound product. By way of example, the user may select a storage unit 301, among those in location recommendation 606, that is closest in proximity to the user to stow the inbound product. The user may select a stowing location by touching or pressing on one or more of the storage units 301 in location recommendation 606. For example, the user may press on the corresponding physical location identifier in interface 601 and press the "Finish Stowing" button 607. Once one or more processors 506 of user device 603 receives the user's selection of a stowing location (e.g., storage unit 301) among the sampled number of locations displayed under location recommendation 606, one or more processors 506 may send the user's selection to one or more processors 505 of stowing management system 501.

After receiving the user's selection of a stowing location among the sampled number of locations, method 700 may proceed to block 706. At block 706, one or more processors 505 of stowing management system 501 may modify a database, such as database 304, to assign a location identifier associated with the selected stowing location to the inbound product. For example, when the user selects a stowing location among the sampled number of locations, one or more processors 506 of user device 603 may send the physical location identifier, such as physical location identifier 302, associated with the selected stowing location (e.g., selected storage unit) to one or more processors 505. Then, one or more processors 505 may modify database 304 to assign the physical location identifier, such as physical location identifier 302, to the inbound product. In some embodiments, one or more processors 505 may modify database 304 to assign the physical location identifier 302 to a product identifier, such as product identifier 602, associated with the inbound product. Accordingly, by updating database 304, one or more processors 505 may be able to monitor in real-time where each inbound product is being stowed.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for providing stowing location recommendation, the system comprising:
   a memory storing instructions; and
   at least one processor configured to execute the instructions to:
   receive, from an application on a user device associated with a user, a request for a location recommendation for stowing at least one inbound product;
   receive, from the user device a scan of a product identifier of the at least one inbound product and a quantity of the at least one inbound product:
   acquire, from one or more sensors, image or video data related to a plurality of locations capable of stowing the at least one inbound product:
   determine, based on the one or more sensors, an emptiness and capacity of each of the plurality of locations;

determine, based on the product identifier and quantity of the at least one inbound product, and the emptiness and capacity of the plurality of locations, a plurality of locations to recommend within a section in a zone, the plurality of recommended locations having an emptiness and real-time capacity to store the at least one inbound product, wherein the plurality of recommended locations have not been recommended to another user different from the user;

sample, based on a predetermined rule, a number of locations from the plurality of recommended locations for stowing the at least one inbound product;

determine, based on the product identifier, whether the at least one inbound product is a food product, a product that needs to be kept frozen, or a product that needs to be kept at a cool temperature;

display, on the user device via a user interface, the sampled number of locations to the user for stowing the at least one inbound product, the displayed locations being selectable, and not recommended to a different user device, wherein the predetermined rule comprises at least one of:
  a first restriction on a number of stock keeping units (SKUs) that can be stored in each location,
  a second restriction on an expiration date associated with each SKU,
  a third restriction on a barcode associated with each SKU,
  a fourth restriction on a risk level associated with each SKU;
  a fifth restriction on a temperature requirement associated with each SKU,
  wherein if the inbound product is determined to be a food product, a product that needs to be kept frozen, or a product that needs to be kept at a cool temperature, the sampled number of locations are selected from a predetermined zone; and
  wherein, if the inbound product has a low risk level product identifier, the inbound product is stowed in a lower height storage unit within the predetermined zone;

receive, from the user device, a selection of a stowing location among the sampled number of locations, wherein if the inbound product is determined to be a food product, a product that needs to be kept frozen, or a product that needs to be kept at a cool temperature, the stowing location is from the predetermined zone;

display, on the user interface, options comprising a product identifier, a quantity of the inbound product, a buffer zone, and a picking zone;

receive, from the user on the user interface, inputs for the options comprising the product identifier, the quantity of the inbound product, the buffer zone, and the picking zone;

display, on the user interface, the location closest to the user device and the inputs;

receive, from the user device, a scan of a location identifier associated with the selected stowing location;

provide a recommendation, based on the predetermined rule, to store products in a particular zone, wherein the recommendation includes the location identifier;

modify a database to assign the location identifier associated with the selected stowing location to the inbound product to monitor each inbound product in real-time using the user interface; and calculate, based on a past demand for the inbound product, an expected demand for the inbound product, a promised delivery date for the inbound product on a periodic basis.

2. The system of claim 1, wherein the recommended plurality of locations are at least 30%, 50%, or 70% empty.

3. The system of claim 1, wherein the at least one processor is configured to provide real-time capacity of a plurality of locations capable of stowing inbound products and one or more restrictions associated with at least one storage unit.

4. The system of claim 1, wherein the zone comprises at least one of a picking zone or a buffer zone and the picking zone is configured to store inbound products that are available for purchase by a customer.

5. The system of claim 1 wherein the zone comprises physical location identifiers associated with at least one storage unit.

6. The system of claim 1, wherein displaying the sampled number of locations comprises displaying a list of at least three, at least five, or at least ten location identifiers associated with at least one storage unit that is capable of receiving the inbound product.

7. The system of claim 1, wherein the risk level associated with a product identifier is based on a monetary value of the corresponding inbound product.

8. The system of claim 1, wherein the at least one processor is configured to execute the instructions to provide a recommendation, based on the first restriction, to store a maximum of three different SKUs in each location.

9. The system of claim 1, wherein the at least one processor is configured to execute the instructions to provide, based on the fifth restriction, a recommendation to store SKUs having temperature requirements higher than a predetermined threshold in a particular location.

10. The system of claim 1, wherein the at least one processor is configured to execute the instructions to provide, based on the fifth restriction, a recommendation to store SKUs having temperature requirements lower than a predetermined threshold in a particular location.

11. A computer-implemented method for providing stowing location recommendation, the method comprising:
  receiving, from an application on a user device associated with a user, a request for a location recommendation for stowing at least one inbound product;
  receiving, from the user device a scan of a product identifier of the at least one inbound product and a quantity of the at least one inbound product;
  acquiring, from one or more sensors, image or video data related to a plurality of locations capable of stowing the at least one inbound product;
  determining, based on the one or more sensors, an emptiness and capacity of each of the plurality of locations;
  determining, based on the product identifier and quantity of the at least one inbound product, and the emptiness and capacity of the plurality of locations, a plurality of locations to recommend within a section in a zone, the plurality of recommended locations having an emptiness and real-time capacity to store the at least one inbound product, wherein the plurality of recommended locations have not been recommended to another user different from the user,
  sampling, based on a predetermined rule, a number of locations from the plurality of recommended locations for stowing the at least one inbound product;
  determining, based on the product identifier, whether the at least one inbound product is a food product, a product that needs to be kept frozen, or a product that needs to be kept at a cool temperature; and displaying, on the user device, via a user interface the sampled number of locations to the user for stowing the at least one inbound product, the displayed locations being selectable, and not recommended to a different user device, wherein the predetermined rule comprises at least one of:
- a first restriction on a number of stock keeping units (SKUs) that can be stored in each location,
- a second restriction on an expiration date associated with each SKU,
- a third restriction on a barcode associated with each SKU,
- a fourth restriction on a risk level associated with each SKU, or
- a fifth restriction on a temperature requirement associated with each SKU, wherein if the inbound product is determined to be a food product, a product that needs to be kept frozen or a product that needs to be kept at a cool temperature, the sampled number of locations are selected from a predetermined zone; and wherein, if the inbound product has a low risk level product identifier, the inbound product is stowed in a lower height storage unit within the predetermined zone;

receiving, from the user device, a selection of a stowing location among the sampled number of locations, wherein if the inbound product is determined to be a food product, a product that needs to be kept frozen, or a product that needs to be kept at a cool temperature, the stowing location is from the predetermined zone;

displaying, on the user interface, options comprising a product identifier, a quantity of the inbound product, a buffer zone, and a picking zone:

receiving, from the user on the user interface, inputs for the options comprising the product identifier, the quantity of the inbound product, the buffer zone, and the picking zone;

displaying, on the user interface, the location closest to the user device and the inputs;

receiving, from the user device a scan of a location identifier associated with the selected stowing location;

provide a recommendation, based on the predetermined rule, to store products in a particular zone, wherein the recommendation includes the location identifier:

modifying a database to assign the location identifier associated with the selected stowing location to the inbound product to monitor each inbound product in real-time using the user interface; and calculate, based on a past demand for the inbound product, an expected demand for the inbound product, a promised delivery date for the inbound product on a periodic basis.

12. The method of claim 11, wherein the recommended plurality of locations are at least 30%, 50%, or 70% empty.

13. The method of claim 11, further comprising: providing real-time capacity of a plurality of locations capable of stowing inbound products and one or more restrictions associated with at least one storage unit.

14. The method of claim 11, wherein the zone comprises at least one of a picking zone or a buffer zone and the picking zone is configured to store inbound products that are available for purchase by a customer.

15. The method of claim 11, wherein the zone comprises physical location identifiers associated with at least one storage unit.

16. The method of claim 11, wherein displaying the sampled number of locations comprises displaying a list of at least three, at least five, or at least ten location identifiers associated with at least one storage unit that is capable of receiving the inbound product.

17. The method of claim 11, wherein the risk level associated with a product identifier is based on a monetary value of the corresponding inbound product.

18. The method of claim 11, further comprising: providing a recommendation, based on the first restriction, to store a maximum of three different SKUs in each location.

19. The method of claim 11, further comprising: providing, based on the fifth restriction, a recommendation to store SKUs having temperature requirements higher than a predetermined threshold in a particular location.

20. The method of claim 11, further comprising: providing, based on the fifth restriction, a recommendation to store SKUs having temperature requirements lower than a predetermined threshold in a particular location.

* * * * *

UNITED STATES PATENT AND TRADEMARK OFFICE
CERTIFICATE OF CORRECTION

Page 1 of 1

PATENT NO. : 12,147,945 B2
APPLICATION NO. : 17/573928
DATED : November 19, 2024
INVENTOR(S) : Ji Eun Kim et al.

It is certified that error appears in the above-identified patent and that said Letters Patent is hereby corrected as shown below:

In the Claims

Claim 1, Column 26, Line 61, "product:" should read --product;--.

Claim 1, Column 26, Line 64, "product:" should read --product;--.

Claim 1, Column 27, Line 9, "user:" should read --user;--.

Claim 1, Column 27, Line 63, "identifier:" should read --identifier;--.

Claim 11, Column 28, Line 48, "product:" should read --product;--.

Claim 11, Column 28, Line 51, "product:" should read --product;--.

Claim 11, Column 28, Line 62, "user," should read --user;--.

Claim 11, Column 29, Line 36, "zone:" should read --zone;--.

Claim 11, Column 30, Line 3, "identifier:" should read --identifier;--.

Signed and Sealed this
Fourteenth Day of January, 2025

Derrick Brent
*Acting Director of the United States Patent and Trademark Office*